United States Patent
Nagarajan (10) Patent No.: US 12,210,402 B2
(45) Date of Patent: Jan. 28, 2025

(54) METHOD TO DETECT SILENT DATA CORRUPTION (SDC) FOR SIMD COMPUTE UNITS

(71) Applicant: Google LLC, Mountain View, CA (US)

(72) Inventor: Rahul Nagarajan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/124,390

(22) Filed: Mar. 21, 2023

(65) Prior Publication Data

US 2024/0320073 A1    Sep. 26, 2024

(51) Int. Cl.
*G06F 11/07* (2006.01)

(52) U.S. Cl.
CPC ...... *G06F 11/0751* (2013.01); *G06F 11/0721* (2013.01)

(58) Field of Classification Search
None
See application file for complete search history.

(56) References Cited

U.S. PATENT DOCUMENTS

| | | | |
|---|---|---|---|
| 11,061,682 B2 * | 7/2021 | Vorbach | G06F 9/327 |
| 2006/0190700 A1 | 8/2006 | Altman et al. | |
| 2009/0144522 A1 * | 6/2009 | Vorbach | G06F 15/80 |
| | | | 712/15 |
| 2014/0156975 A1 | 6/2014 | Sridharan et al. | |
| 2015/0212972 A1 * | 7/2015 | Boettcher | G06F 9/3893 |
| | | | 712/4 |
| 2017/0185465 A1 * | 6/2017 | Ould-Ahmed-Vall | |
| | | | G06F 9/30038 |

OTHER PUBLICATIONS

Extended European Search Report for European Patent Application No. 23193734.3 dated Jan. 29, 2024. 8 pages.
Tarjan et al., "Increasing Memory Miss Tolreance for SIMD Cores," ACM, 2009. 11 pages.
Chen, "SIMD Assisted Fault Detection and Fault Attack Mitigation," Dissertation for Doctor of Philosophy in Computer Science, University of California, Irvine, 2018. 118 pages.
Oleksenko, "SIMD-Swift: Improving Performance of Swift Fault Detection," Master Thesis, Technische Universität Dresden, Nov. 15, 2015. 55 pages.
Chen et al., "SIMD-Based Soft Error Detection," CECS Technical Report 15-04, Center for Embedded and Cyber-Physical Systems, University of California, Irvine, Nov. 17, 2015. 11 pages.

* cited by examiner

*Primary Examiner* — Guerrier Merant
(74) *Attorney, Agent, or Firm* — Lerner David LLP (57) ABSTRACT

An aspect of the disclosed technology is a replay unit that enables replaying computations on unused or empty ALU slots. The replay unit may be added on a per lane basis or within a lane in a SIMD unit or device.

20 Claims, 5 Drawing Sheets

METHOD TO DETECT SILENT DATA CORRUPTION (SDC) FOR SIMD COMPUTE UNITS

BACKGROUND

Silent data corruption (SDC), sometimes referred to as Silent Data Error (SDE), is an industry wide issue that impacts memory, storage, networking, and central processing units (CPUs). An SDC occurs when impacted hardware causes errors in data that is being processed. For example, an impacted CPU may incorrectly determine a value as part of a computation. For large-scale computing systems, such a corruption may propagate to other parts of the system and, ultimately, appear as application-level problems (e.g., crashes, missing rows in a database). For example, in machine learning (ML) thousands of compute chips, such as tensor processing units (TPUs), are typically used to perform distributed computing. In such applications, a single occurrence of a data error can cause the ML model to fail to converge or cause NaN (not a number) propagation. SDCs typically manifest themselves in two ways. First, repeating a computation on the same hardware at different times may produce different results. Second, repeating the computation on different hardware may produce different results.

Compute chips are composed of static random-access memory (SRAM), logic, and wires. The SRAMs are usually protected by a parity mechanism and/or error correction codes (ECC) and, to some extent, the wires can also be protected via parity mechanisms. Parity and ECCs do not modify the data. Compute logic modifies the data and typically does so in non-trivial ways. As such, it is generally more challenging to provide low-cost error detection methodologies for compute logic.

SUMMARY

The disclosed technology may comprise circuitry, apparatus, systems, and/or methods.

For example, the disclosed technology may comprise circuitry for detecting one or more silent data corruptions. The circuitry comprises a first arithmetic logic unit (ALU) of the Single Instruction, Multiple Data (SIMD) unit, the first ALU comprising an unused ALU during an operational cycle of the SIMD unit; a first source register coupled to the first ALU; a second source register coupled to the first ALU; and a comparator coupled to a first output of the first ALU and to a second output of a second ALU, wherein the first ALU outputs a first value by performing a first operation using data from the first source register and data from the second source register, the second ALU outputs a second value by performing the first operation using the data from the first source register and the data from the second source register, and the comparator comparing the first value and the second value and outputs an error if the first value is different than the second value.

In accordance with this aspect of the disclosed technology, the circuitry may comprise a control circuit coupled to the second ALU and the comparator, wherein the control circuit controls when the second ALU performs the first operation and when the comparator obtains the first value. Further, the control circuit causes the second ALU to perform the first operation a pre-determined number of times in a given clock cycle. In addition, the control circuitry includes a first counter that determines a sampling rate that controls how often the second ALU performs the first operation.

In accordance with this aspect of the disclosed technology, the unused ALU slot comprises an ALU slot in a lane of the SIMD compute unit that contains the first ALU and the second ALU.

Further in accordance with this aspect of the disclosed technology, the unused ALU slot comprises an ALU slot in a lane of the SIMD compute unit that contains the first ALU and the second ALU.

Further in accordance with this aspect of the disclosed technology, the first ALU is in a first lane of the SIMD compute unit and the unused ALU slot comprises an ALU slot in a second lane of the SIMD compute unit different than the first lane.

Further in accordance with this aspect of the disclosed technology, the first ALU is in a first ALU slot of the SIMD compute unit and the unused ALU slot comprises the first ALU slot after the first ALU performs the first operation.

In another example, the disclosed technology may comprise a system for detecting one or more silent data corruptions. The system comprises a first compute unit that uses a first set of operations to process a first data operand and a second data operand to produce a first result in processing a workload being processed by the electronic device; and a replay unit comprising a second compute unit, a comparator, and control circuitry, the control circuitry latching the first data operand and the second data operand to one or more memories, the second compute unit using the first set of operations to process the first data operand and the second operand to produce a second result, and the comparator comparing the first result and second result to determine a mismatch; and wherein the second compute unit comprises a compute unit not used during a cycle that the first compute uses the first set of processes to process the first data operand and the second data operand, and wherein the control circuitry signals a mismatch as a silent data error.

In accordance with this aspect of the disclosed technology, the first compute unit comprises a first arithmetic logic unit (ALU) and the second compute unit comprises a second ALU. Further, the electronic device comprises a SIMD unit. Further still, the first ALU unit may be configured in a first lane of the SIMD unit and the second ALU is configured in a second lane of the SIMD unit. Further still, the first ALU unit may be configured in a first lane of the SIMD unit and the second ALU is configured in the first lane of the SIMD unit. In addition, the first ALU unit may be configured in a first lane of the SIMD unit and the second ALU comprises the first ALU after the first ALU performed the first set of operations.

In accordance with this aspect of the disclosed technology, the electronic device comprises a memory unit. Further, the first ALU unit may be configured in a first memory bank of the memory unit and the second ALU is configured in a second memory bank of the memory unit. Further still, the first ALU unit may be configured in a first memory bank of the memory unit and the second ALU comprises the first ALU after the first ALU performed the first set of operations.

In another example, the disclosed technology may comprise a method for detecting one or more silent data corruptions. The method comprises configuring a SIMD unit to perform parallel operations on a workload using a set of compute units, the set of compute units having a first compute unit selected to perform a first computation on at least a portion of the workload and to produce a first output; determining a subset of compute units of the set of compute units not being used to perform computations on the workload, the subset of compute units having a second compute unit; providing to the second compute unit a first source operand and a second source operand used by the first compute unit to perform the first computation; providing to the second compute unit the first computation; operating the second compute unit to output a second output by using the first source operand, the second source operand, and the first computation; and detecting a first silent data corruption if there is a mismatch between the first output and the second output. In accordance with this aspect of the disclosed technology, providing the first source operand and the second source operand to the second compute unit may comprise latching the first source operand and the second source operand to a register accessible by the second compute unit. In accordance with this aspect of the disclosed technology, the second compute unit may comprise the first compute unit and operating the second compute unit comprises operating the first compute unit to output the second output after the first compute unit calculated the first output. Further in accordance with this aspect of the disclosed technology, the set of compute units are configured by forming a plurality of lanes such that each lane has a distinct arithmetic logic unit (ALU) and the first compute unit is in a first lane and the second compute unit is in a second lane.

DETAILED DESCRIPTION

Aspects of the disclosed technology are directed to efficient and/or cost effective solutions for detecting SDCs in Single Instruction, Multiple Data (SIMD) compute units. SIMDs are often used in CPUs, TPUs, and other computing devices. SIMDs take advantage of data-level parallelism by performing a single computation or operation across multiple data elements simultaneously. SIMD units generally comprise (1) multiple lanes that perform the same operation but on different data and (2) multiple arithmetic logic units (ALUs) in each lane that can perform the same operation in parallel. In accordance with aspects of the disclosed technology, a technique is provided for detecting SDCs that takes advantage of the repeated hardware within and across a SIMD computing architecture.

Typically, a certain subset of SIMD units in a compute unit are unused during operations. For example, typically utilization of SIMD units for ML workloads tends to be about 50%-60%. In accordance with an aspect of the disclosed technology, a replay unit is provided that enables replaying computations on unused or empty ALU slots. Such a replay unit would operate transparently to the software. The replay unit may be added on a per lane basis or within a lane. The use of a replay unit in accordance with the disclosed technology provides multiple advantages. For example, the replay unit provides coverage of various types of element-wise or ALU-wise computations performed by a SIMD compute unit, including complex computations that span multiple cycles such as tanh(x) or recip(x). Further, the replay unit may always be on; in other words, it can provide SDC detection while the real work load is running. In addition, it is transparent to the software and provides operations level coverage.

In general, a replay unit is a hardware unit that samples and latches source operands, the result and control words associated with an ALU slot (within or across lanes of a SIMD unit). The latched source operands may be replayed (e.g., recomputed) a configurable number of times within a specified number of cycles and the result(s) of the replay(s) can be compared against the latched result. If there is a mismatch between results, then an error is raised and logged, similar to ECC/parity error for SRAMs.

The replay unit, for example, may comprise three registers including two source registers and one result register, a 32-bit comparator, and a control unit along with one or more 5-6 bit counters for sampling and replay count. The sampling rate, replay count, and window size may be configurable.

Computations may be replayed in a few different ways. For example, a computation can be replayed on a different ALU slot within the same lane. In this instance, if the ALU slots within a SIMD lane are composed of heterogeneous operations, the replay can be more difficult. As another example, a computation can be replayed on a different lane but same slot used for the original computation. This may avoid the complexities associated with heterogenous ALU slot configurations. As another example, the replay may occur on an ALU slot separated temporally. This may be useful for heterogenous ALU slot configurations when replaying in the same lane. This may also make the replay unit more stateful and complex.

Figure 1:
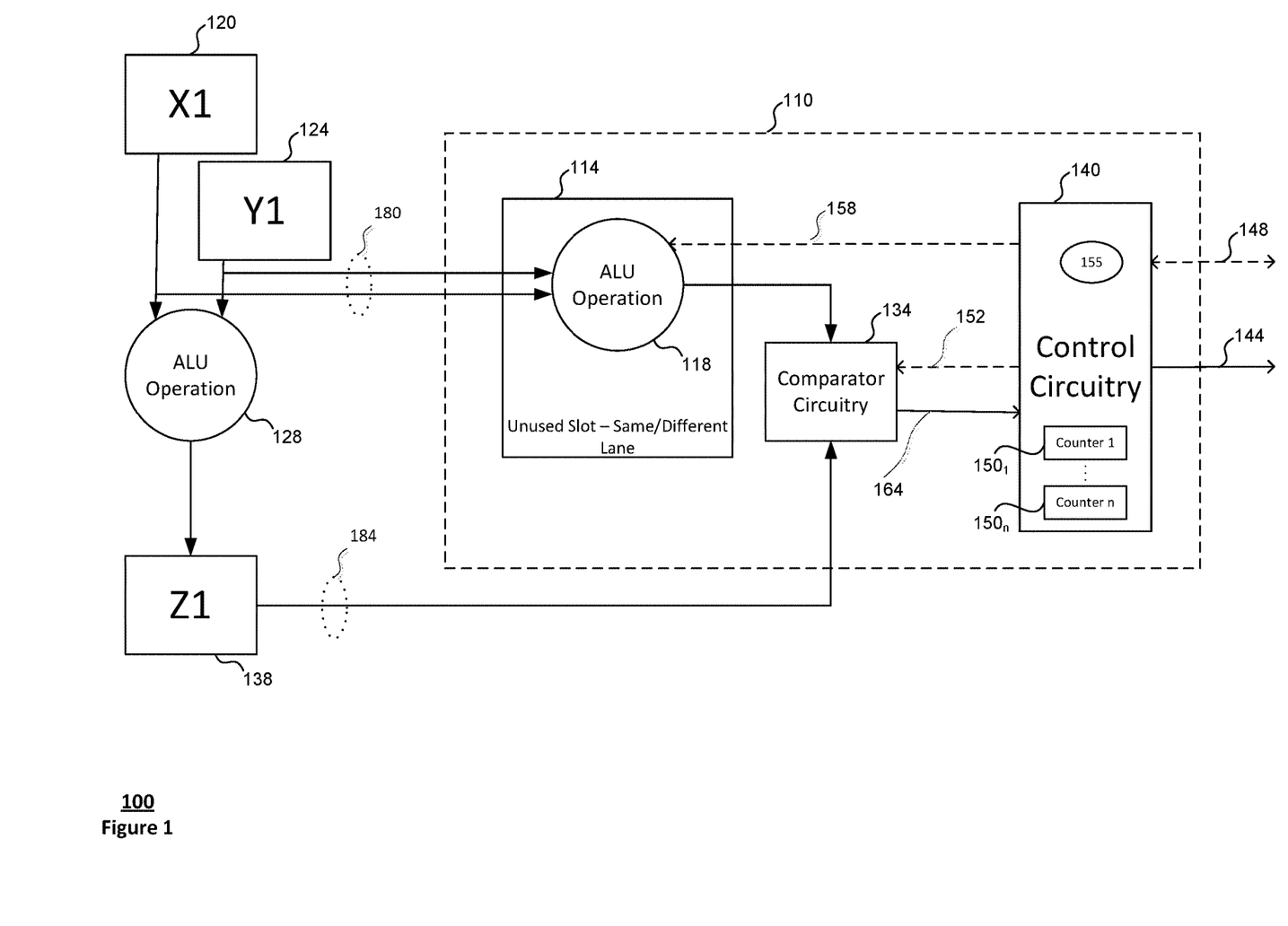
FIG. 1 depicts an example of a circuit diagram in accordance with an aspect of the disclosed technology.

Turning now to FIG. 1, there is depicted a circuit diagram 100 illustrating a replay unit 110 in accordance with an aspect of the disclosed technology. Replay unit 110 includes compute unit or logic unit 114, which will typically comprise an arithmetic logic unit (ALU) configured to perform ALU operation 118. Compute unit or ALU 114 are digital circuits associated with a central processing unit that are used to perform arithmetic and logic operations, as depicted via ALU operation 118. Examples of arithmetic operations include addition, subtraction, multiplication, and division. Examples of logic operations include comparison of values such as NOT, AND, and OR. Compute unit or ALU 114 receives as input, data from source operands 120, 124, which are illustrated as having values of X1 and Y1 respectively. Source operands 120, 124 will typically comprise values in source registers that include other source operands or values.

Compute unit or ALU 114 comprises an unused compute unit or ALU in an unused ALU slot in a SIMD processing architecture. An unused ALU slot comprises a compute unit or ALU in the same or different lane of an SIMD device that is not being used to perform arithmetic or logic operations on data that is currently being processed by a CPU or processor (implementing the SIMD parallel processing) as part of a workload. More specifically, as shown in FIG. 1, source operands 120, 124 are also input to compute unit or ALU 128, which is configured to perform the same ALU operation as ALU 114. ALU 128, however, is an ALU which is being used to operate on data that is currently being processed by the CPU or processor, e.g., considered an active ALU, an ALU used to perform an original computation. In this regard, typically not all compute units or ALUs in SIMD units are used in processing workloads. For example, utilization of SIMD units in processing machine learning (ML) workloads is typically around 50%-60% of the compute units/ALUs available in the CPU or processor. An aspect of the disclosed technology is to use these unused resources as part of one or more replay units used to detect and signal occurrences of SDCs.

More specifically, as shown, replay unit 110 also includes comparator circuitry 134, which receives as input the result of ALU operation 118 and the result of ALU operation 128. As shown, the result of ALU operation 128 is outputted as output operand 138, which will typically comprise a value in a result register. Similarly, as is discussed below, the result of ALU operation 118 will typically be output to a result register in actual implementation (which for the sake of simplicity is not shown in this diagram). Comparator circuitry 134 compares the result of ALU operation 118 with the result of ALU operation 128 to detect if there is a discrepancy between the two results. A discrepancy provides an indication of an SDC. Where a discrepancy is detected comparator circuitry 134 signals control circuitry 140, which comprises circuitry in replay unit 110, of the discrepancy.

Control circuitry 140 comprises logic that controls operations of the replay unit and signals a control unit (not shown), e.g., a CPU/processor/core, via line or bus 144, when an SDC is detected. Control circuitry 140 also communicates with the control unit via a control bus 148. Using control bus 148, the control unit may inform control circuitry 140 of unused ALUs (e.g., identify one or more lanes), source registers/operands, and results registers/operands that may be used in the replay unit, as well as other control information. Control circuitry 140 also includes one or more counters 1501 through 150n. A first counter 1501 may be used to set sampling and a second counter 1502 may be used to determine replay count. The sampling counter 1501 includes one or more values that determines the number of times within a given number of clock cycles the replay unit will replay a given ALU operation associated with an active ALU. The value in sampling counter 1501 can, and most likely should, be configurable. The replay counter 1502 maintains a count of how many times the replay unit replays the given ALU operation.

Control circuitry 140 may receive control information from a control unit via control bus 148. The control information provides an indication of which active ALU slots should be replayed by being provided with the control words, source operands and result operands, along with the values for the sampling counter 1501. This control information may be provided via control buses 152 and 158 to ALU 114 and comparator circuitry 134. In some examples, control circuitry 140, in addition to having counters 150, may also include logic 155 which controls the actual latching process. In other examples, logic 155 may comprise logic that determines which active ALU slots should be replayed, instead of receiving that information from a control unit. In addition, control circuitry 140 may comprise circuitry in a control unit, e.g., application-specific circuitry, that performs the foregoing functions, as opposed to being a separate unit as illustrated in the example of FIG. 1.

In operation, the control circuitry 140 controls which source operands 120, 124, output operand 138 and control words associated with an active ALU slot should be latched to ALU 114. A control word encodes the source register and destination register address, the ALU operation to be performed, whether to get the operands from a bypass path (e.g., lines 180, 184), as well as other control information. Control information for the ALU operation may be provided, for example, to ALU 114 via bus 158. ALU 114 then performs ALU operation 118 on latched source operands 120 (X1) and 124 (Y1) and provides the result to comparator circuitry 134. That result is then compared with the latched output operand 138 by comparator circuitry 134. ALU 114 will perform the ALU operation 118 based on the value included in the sampling counter 1501. For instance, the sampling counter may cause the replay unit 110 to perform replay calculations 3 times every 30 clock cycles. As such, comparator circuitry 134 would then compare the result of ALU operation 118 3 times every 30 clock cycles with the latched result from output operand 138 (Z1). Each time the comparator circuitry 134 detects a mismatch between the replay result from ALU operation 118 and the latched operand result 138, it informs control circuitry 140 of the mismatch via line 164. Control circuitry 140 informs the control unit of the mismatch via line 144. The mismatch would serve as indication of an SDC.

Figure 2:
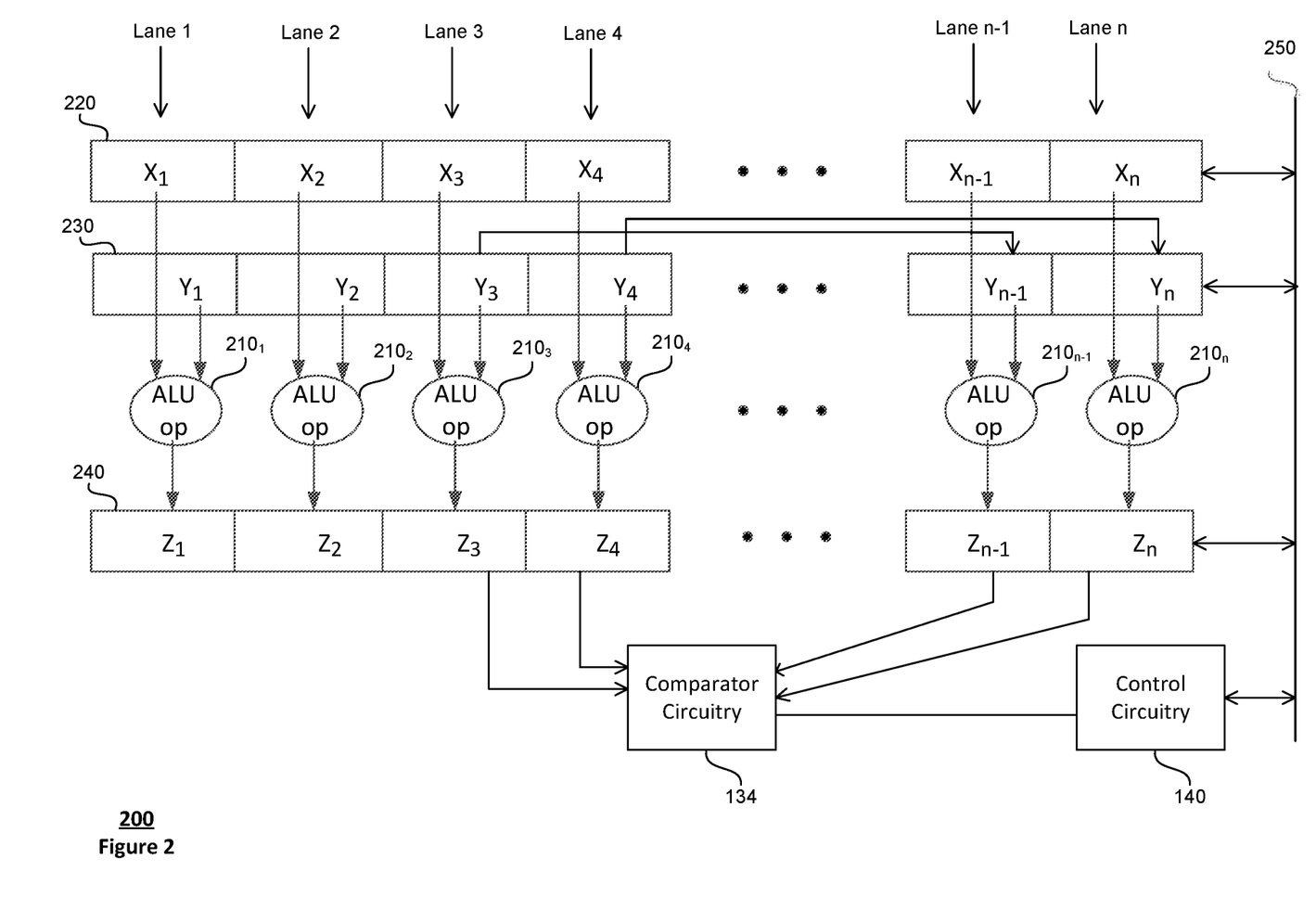
FIG. 2 depicts an example of a circuit diagram in accordance with an aspect of the disclosed technology.

Turning now to FIG. 2, there is shown an example of SIMD unit 200 having n lanes configured to perform n versions of an ALU operation 210 in parallel. As shown, a first register 220 includes n source operands X1 through Xn, a second register 230 includes another n source operands Y1 through Yn. When active an ALU operation is performed on respective source operands, e.g., Xi, Yi, and output to results register 240 as a result operand Zi. In accordance with an aspect of the disclosed technology, one or more respective source operands may be latched to unused ALUs and used as part of a replay unit.

Specifically, let's assume that lanes n−1 and n are not being used in performing operations being carried out by the SIMD unit 200 in processing a workload. Control circuitry (e.g., control circuitry 140) uses bus 250 to latch X3, Y3 to Xn−1, Yn−1, and X4, Y4 to Xn, Yn, respectively, so that ALU operators 210 in lanes n and n−1 can replay the computations being performed in lanes 3 and 4. The results, operands Z3 and Z4, are provided to comparator circuitry 134. ALU operators $210_1$ and $210_n$ replicate the computations, respectively, for Xn−1, Yn−1 and Xn, Yn. Comparator circuitry 134 then compares the results in Zn−1 to Z3 and Z4 to Zn. Mismatches resulting from the comparison comprise an indication of an SDC. In this example, the replay unit is formed using a different lane in the SIMD architecture than the active lanes.

Depending on the number of unused lanes and available computing resources, it is possible that the replay unit may comprise as many lanes as there are active lanes in the SIMD unit or architecture. For instance, as indicated above, some workloads may only use 50%-60% of the processing or compute capability of a SIMD device. In a case where 50% or less of the compute units are being used, the remaining unused compute units may be used to replay the operations being carried out by all active compute units, provided such duplication does not impact overall operations of the control unit. For instance, it may be inefficient computationally to have the control unit manage the processing of an equal number of replay units and active compute units.

In other examples, the control circuitry 140 may latch different active lanes to different ones of unused lanes or compute units at different times. Specifically, control circuitry logic may be configured such that different source and output operands get latched to available replay units (or lanes) at different times during the processing of a workload. In this way, based on the value of the sampling counter, different source and result operands can be replayed at different times in the specified number of clock cycles. As a specific example, with reference to FIG. 2, assume that lanes n−1 and n are available for use as part of a replay unit (or two replay units given that two lanes are being replayed) for lanes 1 through 4. The control circuitry may latch lane 1 source operands (i.e., X1, Y1) and lane 2 source operands (i.e., X2, Y2) to the source operands in lanes n, n−1, respectively. Lanes n and n−1 can then compute output operands Zn−1 (using X1, Y1) and Zn (using X2, Y2), with the respective ALU operations 210. The result operands Zn−1, Zn may then be compared with Z1, Z2, respectively, and any mismatch signaled as an SDC. In other subsequent clock cycles, the control circuitry may latch lane 3 source operands (i.e., X3, Y3) and lane 4 source operands (i.e., X4, Y4) to the source operands in lanes n, n−1, respectively. Lanes n and n−1 can then compute output operands Zn−1 (using X3, Y3) and Zn (using X4, Y4), with the respective ALU operators 210. The result operands Zn, Zn−1 may then be compared with Z3, Z4, respectively, and any mismatch signaled as an SDC. This approach may be expanded to a much larger set of active lanes such that over time the computations performed by all active lanes get replayed. In effect, the replay computation and detection capability can be applied over different cycles across all the lanes and compute units or ALUs that make up a SIMD unit.

In another aspect of the disclosed technology, the replay unit may comprise the same ALU slot or lane used in making the original computation (e.g., a computation performed in an active lane). Specifically, using lane 1 in FIG. 2, the replay unit may comprise the source and results operands X1, Y1, and Z1 and ALU operation 210. The control circuitry may operate such that it latches the source and result operands at a given instant of time to a local memory. At a later time, the control circuitry then latches these values back to lane 1 and have the computations replayed in lane 1 and then compares the results to the earlier stored value of Z1. If there is a discrepancy, an SDC is indicated. As discussed above, this approach may be used in configurations where the ALU slot or lane is heterogeneous such that ALU operations are not the same in each lane.

Figure 3:
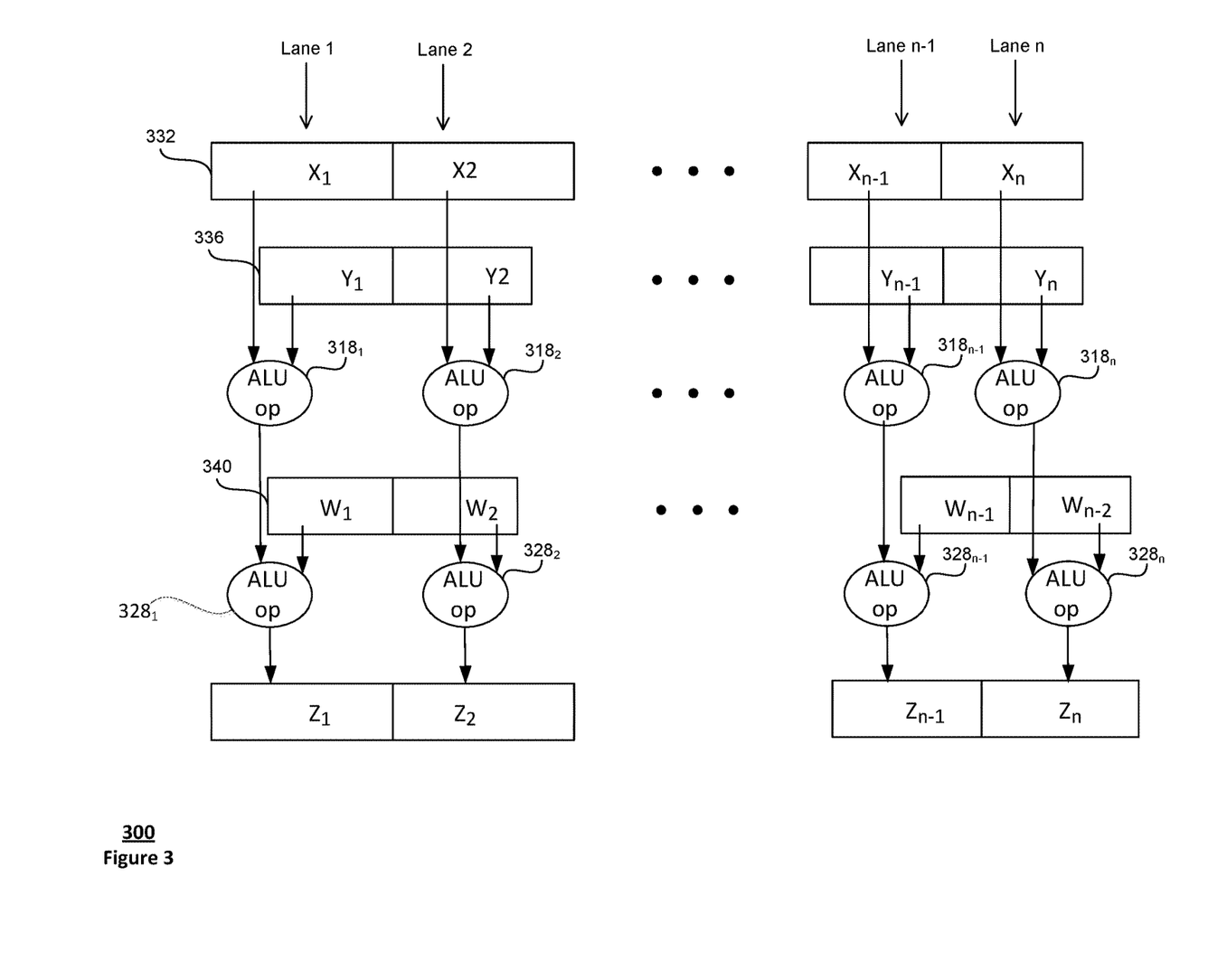
FIG. 3 depicts an example of a circuit diagram in accordance with an aspect of the disclosed technology.

Turning now to FIG. 3, there is shown a SIMD unit 300 in accordance with an aspect of the disclosed technology. As shown, in this example, each lane within SIMD unit 300 has more than one ALU operations 318, 328. Specifically, as shown, ALU operators 318 receive as inputs the X and Y operands from registers 332 and 336 respectively. ALU operators 328 take as inputs the result of ALU operators 318 and operands W in register 340. The control circuitry may be configured such that ALU operators 328 are used to replay the operations of operators 318 within a given lane. Specifically, ALU operator 328 in lane 1 may perform the same operation on X1, Y1 performed by operator 318 and the result of the original computation by operator 318 is then compared to the result by operator 328. In this example, the ALU slots ($318_1$ and $328_1$) in each lane are assumed to support the same subset of operations in providing instruction-level parallelism. In some examples, the slots within a lane may however support a different subset of operations, i.e., heterogeneous operations. For instance, ALU slot 1 ($318_1$) may support a floating point add and ALU slot 2 ($318_2$) may support only floating point multiply. This composition would not allow ALU slot 2 to replay ALU slot 1, and vice versa. In such a circumstance, the computation can be replayed by the original compute unit or ALU separated temporally as described above. Note though, on the other hand, respective slots on all lanes support the same operation (e.g., slot 1 on lanes 1, etc. of FIG. 2 would support floating point add), which allows for them to be always replayed across lanes.

Figure 4:
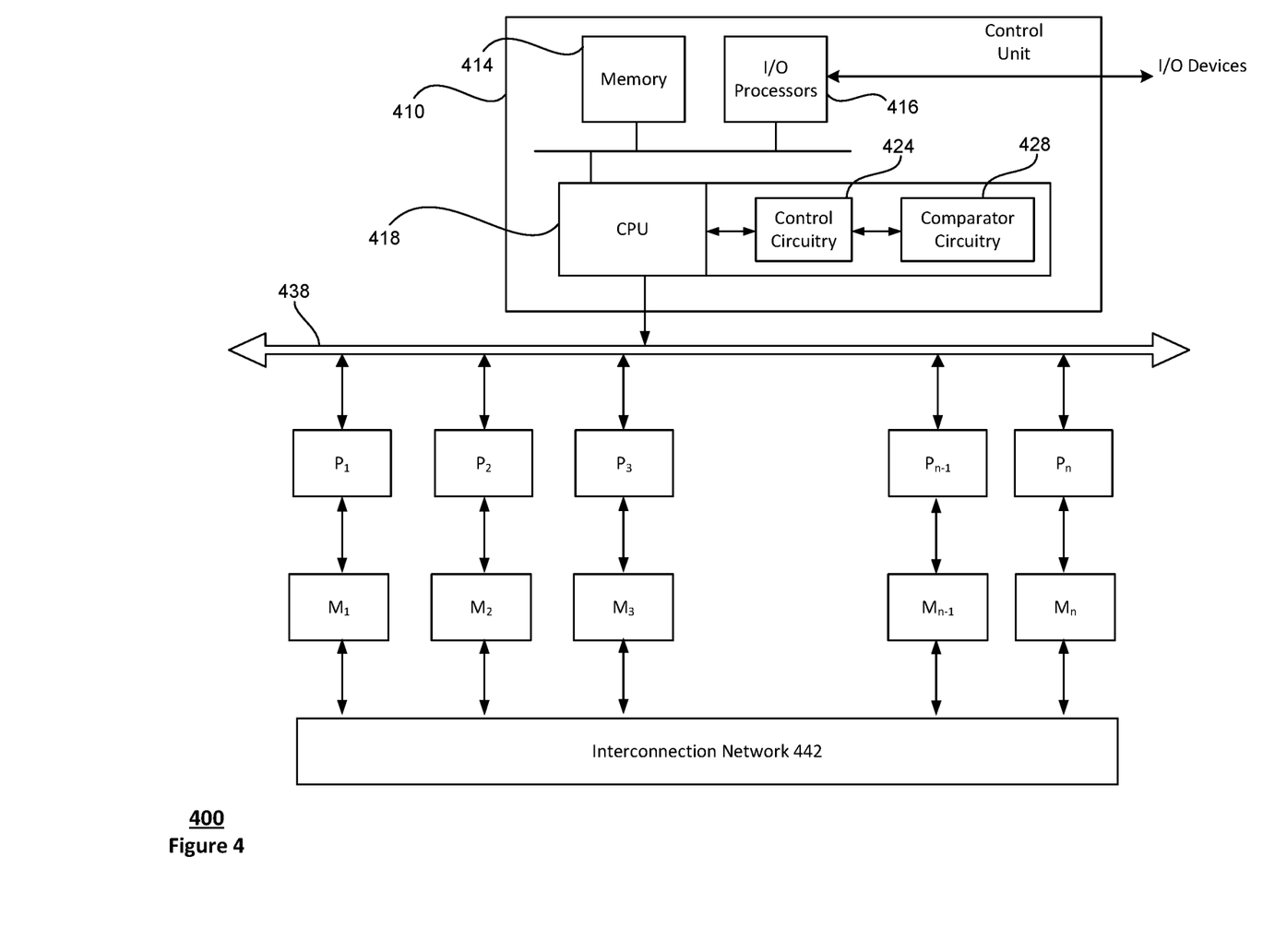
FIG. 4 depicts an example of a circuit diagram in accordance with an aspect of the disclosed technology.

Turning now to FIG. 4, there is shown a circuit diagram of a system 400 in accordance with one or more aspects of the disclosed technology. System 400 includes a control unit 410. Control unit 410 includes one or more memories 414, input/output (I/O) processors 416 for connection to input/output devices, a CPU 418, control circuitry 424 and comparator circuitry 428. Control circuitry 424 and comparator circuitry 428 may comprise similarly named circuitry discussed above. Control unit 410 may receive one or more workloads for processing via I/O processors 416. These workloads may comprise machine learning or other applications that require the same operation to be performed on a stream of data or various data. CPU 418 comprises a SIMD machine that may implement processing elements Pi and local memories Mi to perform operations in parallel on the incoming data and provide the results as output. Processors Pi function as compute units in the SIMD architecture and may each include one or more ALUs arranged to perform operations on source operands residing in memory Mi and store the results in memory Mi. Memory Mi may comprise one or more registers that accessible by a given processor Pi.

The CPU 418 communicates with the processing elements Pi via a control and/or data bus 438, which may comprise an instruction broadcast bus. The processing elements Pi may communicate with each other via an interconnection network 442, or alternatively share information via an intermediate processor coupled to the interconnection network 442. Each processing element Pi may also operate to provide the result operands stored in its respective memory Mi back to CPU 418 via control and/or data bus 438. CPU 418 communicates with control circuitry 424, which is shown as communicating with comparator circuitry 428. In other examples, instead of being coupled to control circuitry 424, comparator circuitry 428 may be coupled to the CPU 418. In some examples, both control circuitry 424 and comparator circuitry 428 may comprise components implemented as part of CPU 418. For instance, control circuitry and comparator circuitry may be implemented in the CPU 418 as application-specific integration circuits (ASICs). Alternatively, they may be implemented as separate ASICs outside the CPU as depicted in FIG. 4.

CPU 418 may comprise a multi-core device in which each core includes a control unit, multiple ALUs, and a cache memory. For example, each core may comprise the processing element (Pi) and memory (Mi) arrangement shown in FIG. 4. As mentioned previously, each processing element may be configured to carry out the same operation on a given set of data. Such operations may take the form of instructions such as machine code or script. Such instructions may be stored as computing device code on a storage or computing device-readable medium accessible via the I/O devices. In that regard, the terms "instructions" and "programs" should be considered interchangeable herein. The instructions may be stored in object code format for direct processing by the processor, or in any other computing device language, including scripts or collections of independent source code modules that are interpreted on demand or compiled in advance.

The storage medium may also store data to be processed. Such data may comprise data to be processed by the control unit 410, or more pointedly CPU 418. Such data may include data to support machine learning applications, hosting web-based applications, file share services, communication services, gaming, sharing video or audio files, or any other network-based services. The storage medium may comprise any medium for storing data that may be read with the aid of an electronic device, such as a hard drive, memory card, ROM, RAM, DVD, or other optical disks, as well as other write-capable and read-only memories.

The instructions, after being obtained from the storage medium, are loaded into memory 414 and used to operate on the data. Memory 414 will typically comprise RAM, which is used by the CPU to store machine code and data being processed. In some examples, memory 414 may comprise a dual in-line memory module (DIMM).

Figure 5:
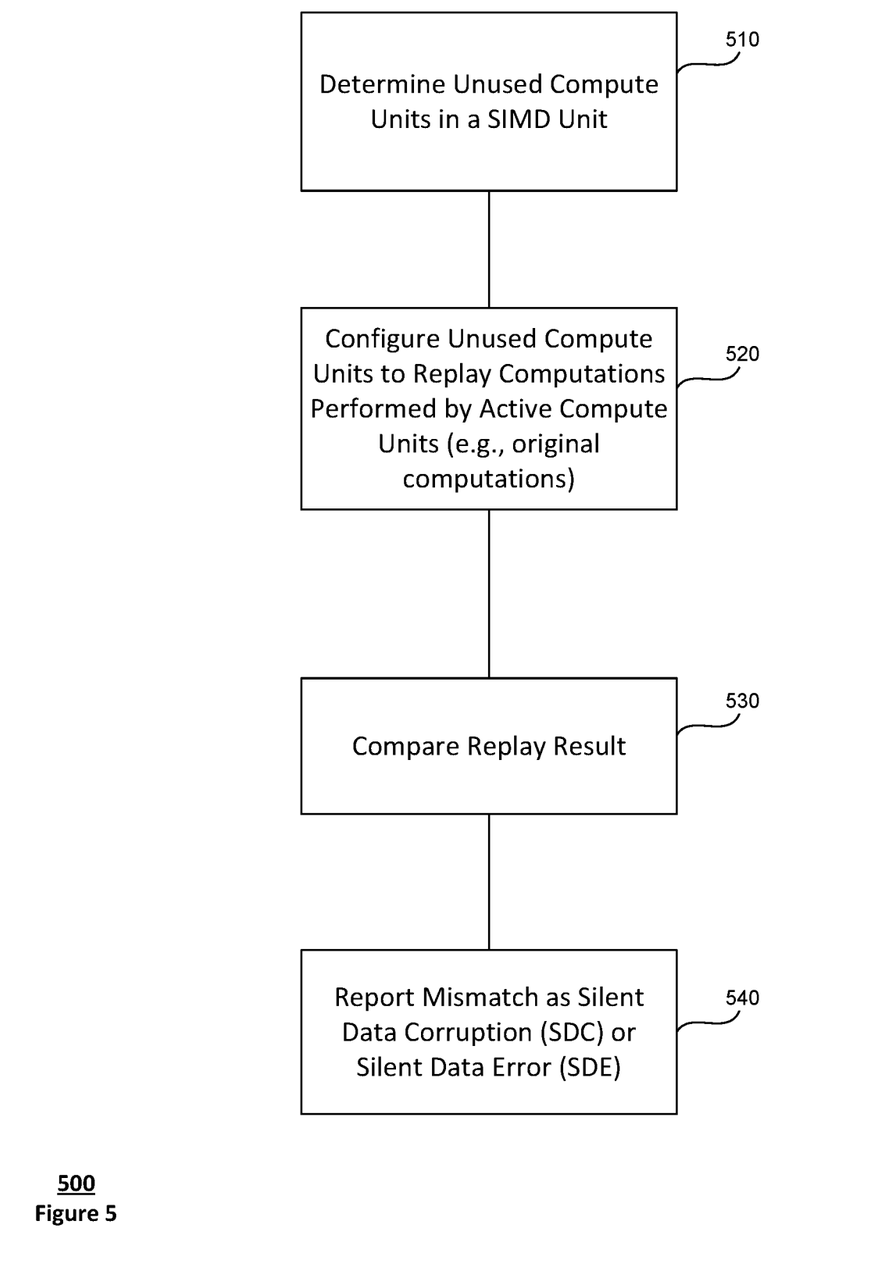
FIG. 5 depicts an example of a process flow in accordance with an aspect of the disclosed technology.

FIG. 5 shows a high level process flow 500 in accordance with an aspect of the disclosed technology. The process includes a step 510 of determining unused compute units in a SIMD unit. The unused compute units are units not being used to perform operations on workload being processed by the SIMD unit. As discussed above, the compute units may comprise an ALU configured to perform a particular operation by a core of a CPU.

Once the unused compute units are identified, the process continues at step 520 by using these unused compute units to replay computations performed by other or active compute units in the SIMD unit. For example, the active compute units may be performing original computations on data as a part of workload. Those original computations will typically include performing the same ALU operation in parallel across a data vector. Specifically, the ALU will obtain one or more source operands, perform the ALU operation, and store the results of the operation as a result operand. The source and result operands will typically be stored in registers in the SIMD unit. The source operands are latched to an unused ALU to perform the original computation so that a replay result is generated.

The replay result is then compared to the original computation results at step 530 to determine whether there is a mismatch. If there is a mismatch, it is reported at step 540 as a SDC/SDE. If there is no mismatch, processing of the data continues normally without reporting a SDC/SDE.

While the technology is discussed above in the context of SIMD devices, the concepts apply in other hardware contexts. For example, it can also be applied in memories. RAM or cache memory are typically organized into memory banks. A memory bank comprises a logical storage unit within the memory that is used for storing and retrieving data. Each memory bank is associated with an ALU that is used to calculate error codes when data is stored. When the data is read, the ALU decodes the stored data and determines whether there are errors. In accordance with the disclosed technology, unused memory banks may be used to replay the encoding process and compare the replay results to the original results to determine if there is a mismatch. A mismatch would indicate possible SDCs. Mismatches can be reported to the memory controller and logged.

In accordance with the foregoing, aspects of the disclosed technology may be embodied in circuitry, systems, and/or methods that include one or more of the following features, sub-features, and combinations of same in the following feature listing:

F1. Circuitry for detecting silent data corruptions in a Single Instruction, Multiple Data (SIMD) unit, comprising:
  a first arithmetic logic unit (ALU) of the SIMD unit, the first ALU comprising an unused ALU during an operational cycle of the SIMD unit;
  a first source register coupled to the first ALU;
  a second source register coupled to the first ALU; and
  a comparator coupled to a first output of the first ALU and to a second output of a second ALU,
  wherein the first ALU outputs a first value by performing a first operation using data from the first source register and data from the second source register,
  the second ALU outputs a second value by performing the first operation using the data from the first source register and the data from the second source register, and
  the comparator comparing the first value and the second value and outputs an error if the first value is different than the second value.

F2. The circuitry of F1, comprising a control circuit coupled to the second ALU and the comparator, wherein the control circuit controls when the second ALU performs the first operation and when the comparator obtains the first value.

F3. The circuitry of any one of F1 to F2, wherein the control circuit causes the second ALU to perform the first operation a pre-determined number of times in a given clock cycle.

F4. The circuitry of any one of F1 to F2, wherein the control circuitry includes a first counter that determines a sampling rate that controls how often the second ALU performs the first operation.

F5. The circuitry of any one of F1 to F4, wherein the unused ALU slot comprises an ALU slot in a lane of the SIMD compute unit that contains the first ALU and the second ALU.

F6. The circuitry of any one of F1 to F5, wherein the first ALU is in a first lane of the SIMD compute unit and the unused ALU slot comprises an ALU slot in a second lane of the SIMD compute unit different than the first lane.

F7. The circuitry of any one of F1 to F6, wherein the first ALU is in a first ALU slot of the SIMD compute unit and the unused ALU slot comprises the first ALU slot after the first ALU performs the first operation.

F8. A system for detecting silent data errors in an electronic device, comprising:
  a first compute unit that uses a first set of operations to process a first data operand and a second data operand to produce a first result in processing a workload being processed by the electronic device;
  a replay unit comprising a second compute unit, a comparator, and control circuitry,
    the control circuitry latching the first data operand and the second data operand to one or more memories,
    the second compute unit using the first set of operations to process the first data operand and the second operand to produce a second result, and
    the comparator comparing the first result and second result to determine a mismatch; and
  wherein the second compute unit comprises a compute unit not used during a cycle that the first compute uses the first set of processes to process the first data operand and the second data operand, and
  wherein the control circuitry signals a mismatch as a silent data error.

F9. The system of F8, wherein the first compute unit comprises a first arithmetic logic unit (ALU) and the second compute unit comprises a second ALU.

F10. The system of any one of F8 to F9, wherein the electronic device comprises a SIMD unit.

F11. The system of any one of F8 to F10, wherein the first ALU unit is configured in a first lane of the SIMD unit and the second ALU is configured in a second lane of the SIMD unit.

F12. The system of any one of F8 to F10, wherein the first ALU unit is configured in a first lane of the SIMD unit and the second ALU is configured in the first lane of the SIMD unit.

F13. The system of any one of F8 to F10, wherein the first ALU unit is configured in a first lane of the SIMD unit and the second ALU comprises the first ALU after the first ALU performed the first set of operations.

F14. The system of any one of F8 to F13, wherein the electronic device comprises a memory unit.

F15. The system of F14, wherein the first ALU unit is configured in a first memory bank of the memory unit and the second ALU is configured in a second memory bank of the memory unit.

F16. The system of F14, wherein the first ALU unit is configured in a first memory bank of the memory unit and the second ALU comprises the first ALU after the first ALU performed the first set of operations.

F17. A method for detecting silent data corruptions in a Single Instruction, Multiple Data (SIMD) unit, comprising:
  configuring the SIMD unit to perform parallel operations on a workload using a set of compute units, the set of compute units having a first compute unit selected to perform a first computation on at least a portion of the workload and to produce a first output;
  determining a subset of compute units of the set of compute units not being used to perform computations on the workload, the subset of compute units having a second compute unit;
  providing to the second compute unit a first source operand and a second source operand used by the first compute unit to perform the first computation;
  providing to the second compute unit the first computation;
  operating the second compute unit to output a second output by using the first source operand, the second source operand and the first computation; and
  detecting a first silent data corruption if there is a mismatch between the first output and the second output.

F18. The method of F17, wherein the providing the first source operand and the second source operand to the second compute unit comprises latching the first source operand and the second source operand to a register accessible by the second compute unit.

F19. The method of any one of F17 to F18, wherein the second compute unit comprises the first compute unit and operating the second compute unit comprises operating the first compute unit to output the second output after the first compute unit calculated the first output.

F20. The method of any one of F17 to F19, wherein the set of compute units are configured by forming a plurality of lanes such that each lane has a distinct arithmetic logic unit (ALU) and the first compute unit is in a first lane and the second compute unit is in a second lane.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Circuitry for detecting silent data corruptions in a Single Instruction, Multiple Data (SIMD) unit, comprising:
  a first arithmetic logic unit (ALU) of the SIMD unit, the SIMD unit comprising at least an unused ALU slot that includes the first ALU and the first ALU comprises an unused ALU during processing of a workload and that is used to perform data corruption detection associated with processing the workload;
  a first source register coupled to the first ALU;
  a second source register coupled to the first ALU; and
  a comparator coupled to a first output of the first ALU and to a second output of a second ALU,
  wherein the first ALU outputs a first value by performing a first operation in processing the workload using data from the first source register and data from the second source register,
  the second ALU outputs a second value by performing the first operation in processing the workload using the data from the first source register and the data from the second source register, and
  the comparator comparing the first value and the second value and outputs an error if the first value is different than the second value.

2. The circuitry of claim 1, further comprising a control circuit coupled to the second ALU and the comparator, wherein the control circuit controls when the second ALU performs the first operation and when the comparator obtains the first value.

3. The circuitry of claim 2, wherein the control circuit causes the second ALU to perform the first operation a pre-determined number of times in a given clock cycle.

4. The circuitry of claim 2, wherein the control circuitry includes a first counter that determines a sampling rate that controls how often the second ALU performs the first operation.

5. The circuitry of claim 1, wherein the unused ALU slot is an ALU slot in a specific lane of the SIMD unit, the specific lane of the SIMD unit containing both the first ALU and the second ALU.

6. The circuitry of claim 1, wherein the first ALU is in a first lane of the SIMD unit and the unused ALU slot is an ALU slot in a second lane of the SIMD unit different than the first lane.

7. The circuitry of claim 1, wherein the first ALU is in a first ALU slot of the SIMD unit and the unused ALU slot is the first ALU slot after the first ALU performs the first operation.

8. A system for detecting silent data errors in an electronic device, comprising:
  a first compute unit that uses a first set of operations to process a first data operand and a second data operand to produce a first result in processing a workload being processed by the electronic device;
  a replay unit comprising a second compute unit, a comparator, and control circuitry,
    the control circuitry latching the first data operand and the second data operand to one or more memories,
    the second compute unit using the first set of operations to process the first data operand and the second operand to produce a second result, and
    the comparator comparing the first result and the second result to determine a mismatch; and
  wherein the second compute unit is not used during an operational cycle that the first compute unit uses the first set of operations to process the first data operand and the second data operand, and
  wherein the control circuitry signals a mismatch as a silent data error.

9. The system of claim 8, wherein the first compute unit comprises a first arithmetic logic unit (ALU) and the second compute unit comprises a second ALU.

10. The system of claim 9, wherein the electronic device comprises a SIMD unit.

11. The system of claim 10, wherein the first ALU is configured in a first lane of the SIMD unit and the second ALU is configured in a second lane of the SIMD unit.

12. The system of claim 10, wherein the first ALU is configured in a first lane of the SIMD unit and the second ALU is configured in the first lane of the SIMD unit.

13. The system of claim 10, wherein the first ALU is configured in a first lane of the SIMD unit and the second ALU is configured using the first ALU after the first ALU performed the first set of operations.

14. The system of claim 9, wherein the electronic device comprises a memory unit.

15. The system of claim 14, wherein the first ALU is configured in a first memory bank of the memory unit and the second ALU is configured in a second memory bank of the memory unit.

16. The system of claim 14, wherein the first ALU is configured in a first memory bank of the memory unit and the second ALU is configured using the first ALU after the first ALU performed the first set of operations.

17. A method for detecting silent data corruptions in a Single Instruction, Multiple Data (SIMD) unit, comprising:
configuring the SIMD unit to perform parallel operations on a workload using a set of compute units, the set of compute units having a first compute unit selected to perform a first computation on at least a portion of the workload and to produce a first output;
determining a subset of compute units of the set of compute units not being used to perform computations on the workload, the subset of compute units having a second compute unit;
providing to the second compute unit a first source operand and a second source operand used by the first compute unit to perform the first computation;
providing to the second compute unit the first computation;
operating the second compute unit to output a second output by using the first source operand, the second source operand and the first computation; and
detecting a first silent data corruption if there is a mismatch between the first output and the second output.

18. The method of claim 17, wherein the providing the first source operand and the second source operand to the second compute unit comprises latching the first source operand and the second source operand to a register accessible by the second compute unit.

19. The method of claim 17, wherein the second compute unit is the first compute unit and operating the second compute unit comprises operating the first compute unit to output the second output after the first compute unit calculated the first output.

20. The method of claim 17, wherein the set of compute units are configured by forming a plurality of lanes such that each lane has a distinct arithmetic logic unit (ALU) and the first compute unit is in a first lane and the second compute unit is in a second lane.

* * * * *